(12) United States Patent
Greif et al.

(10) Patent No.: US 10,379,692 B2
(45) Date of Patent: Aug. 13, 2019

(54) CIRCUIT ARRANGEMENT HAVING A RESISTIVE TOUCH SCREEN, MEDICAL IMAGING APPLIANCE HAVING A RESISTIVE TOUCH SCREEN AND METHOD FOR OPERATING A RESISTIVE TOUCH SCREEN

(71) Applicants: Peter Greif, Pinzberg/Gosberg (DE); Harald Karl, Fürth (DE); Lennart Kilian, Gauting (DE); Torsten König, Erlangen (DE)

(72) Inventors: Peter Greif, Pinzberg/Gosberg (DE); Harald Karl, Fürth (DE); Lennart Kilian, Gauting (DE); Torsten König, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 194 days.

(21) Appl. No.: 14/962,117

(22) Filed: Dec. 8, 2015

(65) Prior Publication Data

US 2016/0162081 A1 Jun. 9, 2016

(30) Foreign Application Priority Data

Dec. 9, 2014 (DE) .................. 10 2014 225 235

(51) Int. Cl.
*G06F 3/041* (2006.01)
*G06F 3/045* (2006.01)

(52) U.S. Cl.
CPC ............ *G06F 3/045* (2013.01); *G06F 3/0416* (2013.01); *G06F 3/0418* (2013.01); *G06F 2203/04113* (2013.01)

(58) Field of Classification Search
CPC ...................... G06F 3/045; G06F 2203/04113
See application file for complete search history.

(56) References Cited

U.S. PATENT DOCUMENTS 3,699,439 A * 10/1972 Turner .................... G06F 3/045
178/18.03
4,079,194 A * 3/1978 Kley ....................... G06F 3/045
178/18.05

(Continued)

FOREIGN PATENT DOCUMENTS

| CN | 101201713 A | 6/2008 |
| CN | 102439552 A | 5/2012 |
| CN | 102541388 A | 7/2012 |

OTHER PUBLICATIONS

German Office Action for related German Application No. 10 2014 225 235.0 dated Jan. 10, 2017 with English Translation.
Chinese Office Action for related Chinese Application No. 201510899663.6, dated Feb. 12, 2018.

*Primary Examiner* — Priyank J Shah
(74) *Attorney, Agent, or Firm* — Lempia Summerfield Katz LLC

(57) ABSTRACT

A circuit having a resistive touch screen, a medical imaging appliance having a resistive touch screen and a method for operating a resistive touch screen are provided. The circuit has a resistive touch screen with a resistive first layer and a resistive second layer that are arranged parallel above one another. Voltage dividers of the first and second layers are formed by contact with the touch screen and are extended by electrical resistors arranged at edges of the first and second layers.

17 Claims, 2 Drawing Sheets

(56) References Cited

U.S. PATENT DOCUMENTS

| | | | | |
|---|---|---|---|---|
| 4,625,075 A * | 11/1986 | Jaeger | ............... | G06F 3/045 178/18.03 |
| 5,818,430 A * | 10/1998 | Heiser | ............... | G06F 3/045 345/174 |
| 6,670,949 B1 * | 12/2003 | Ahn | ............... | G06F 3/045 178/18.03 |
| 7,215,330 B2 * | 5/2007 | Rantet | ............... | G06F 3/045 345/173 |
| 8,294,688 B2 | 10/2012 | Sarasmo | | |
| 2005/0041018 A1 * | 2/2005 | Philipp | ............... | G06F 3/045 345/178 |
| 2005/0076824 A1 * | 4/2005 | Cross | ............... | G06F 3/045 116/205 |
| 2008/0142280 A1 | 6/2008 | Yamamoto et al. | | |
| 2010/0097343 A1 * | 4/2010 | Fang | ............... | G06F 3/0416 345/174 |
| 2011/0037487 A1 * | 2/2011 | Fang | ............... | G06F 3/0416 324/679 |
| 2012/0001866 A1 * | 1/2012 | Rapakko | ............... | G06F 3/045 345/174 |
| 2012/0032893 A1 * | 2/2012 | Calpe Maravilla | ............... | G06F 3/045 345/173 |
| 2012/0127125 A1 | 5/2012 | Ito et al. | | |
| 2012/0249472 A1 * | 10/2012 | Hong | ............... | G06F 3/045 345/174 |
| 2012/0327017 A1 * | 12/2012 | Sekizawa | ............... | G06F 3/045 345/174 |
| 2013/0063365 A1 | 3/2013 | Schmidt et al. | | |
| 2013/0201148 A1 * | 8/2013 | Paulsen | ............... | G06F 3/044 345/174 |
| 2013/0277192 A1 * | 10/2013 | Nakajima | ............... | G06F 3/045 200/512 |
| 2016/0048245 A1 * | 2/2016 | Papakostas | ............... | G06F 3/045 345/174 |

* cited by examiner

CIRCUIT ARRANGEMENT HAVING A RESISTIVE TOUCH SCREEN, MEDICAL IMAGING APPLIANCE HAVING A RESISTIVE TOUCH SCREEN AND METHOD FOR OPERATING A RESISTIVE TOUCH SCREEN

CROSS-REFERENCE TO RELATED APPLICATION

This application claims priority under 35 U.S.C. § 119 to German Patent Application No. 102014225235.0, filed on Dec. 9, 2014, the entire content of which is incorporated herein by reference.

FIELD

The present embodiments relate to a circuit arrangement having a resistive touch screen and a method for operating a resistive touch screen.

BACKGROUND

Operator control of medical imaging appliances may involve the use of "touch panels" (e.g., control panels) having a resistive touch screen (e.g., touch-sensitive screen). The safety requirements of European Medical Safety Standard EN60601, inter alia, are to be met.

Resistive touch screens react to pressure that locally connects two electrically conductive layers. The layers thus form a voltage divider that is used to measure the electrical resistance in order to ascertain the position of the pressure location. Such touch screens include an outer polyester layer and an inner glass or plastic plate that are separated from one another by spacers. The areas facing one another are coated with indium tin oxide, a transparent semiconductor.

In order to ascertain the position of the pressure location, DC voltage is applied to one of the conductive layers. The voltage drops uniformly from one edge of the layer to the opposite edge. At the pressure location, the voltage on both layers is the same because the conductive layers are connected at the pressure location point. The second conductive layer is the connection of the pressure location point to the outside. Two voltages may be measured between the edge of the second layer and the two opposite edges of the first layer. If the two voltages are the same, the pressure point is exactly in the center between the two edges of the first layer. The higher one voltage is in relation to the other, the further away the pressure point is from the respective edge.

A second measurement is performed with the roles of the two layers reversed, so that the distances to the other two edges may be ascertained. Then, the position in the area is established. In order to record both dimensions, the DC voltage is thus applied alternately crosswise. Errors in the actuating electronics of the touch screen may lead to erroneous position finding on the screen that may ultimately lead to dangerous states in the case of a medical imaging appliance. By way of example, errors in the actuating circuit leading to a position at the outermost edge of the touch screen may be erroneously measured instead of the correct position.

SUMMARY OF THE INVENTION

The scope of the present invention is defined solely by the appended claims and is not affected to any degree by the statements within this summary.

The present embodiments may obviate one or more of the drawbacks or limitations in the related art. For example, a touch screen and a method for operating a touch screen that distinguish whether a measured position at an edge of the touch screen corresponds to an actual touch screen control operation or is the consequence of an error are provided.

In order to be able to distinguish whether the measured position of a touch screen control operation corresponds to an actual control operation or is the consequence of an error in an actuating circuit, the disclosed embodiments involve the user interface of the touch screen being virtually extended. An electrical resistor is arranged in front of and behind each of the conductive layers of the touch screen, extending the voltage divider of the resistive touch screen. This addition to the circuit arrangement corresponds to a virtually extended touch screen.

In this extended circuit arrangement, touch screen control operations on the touch screen prompt the measurement of voltages in the region of the inner voltage divider of the touch screen. In the circuit arrangement according to one or more of the present embodiments, errors in the actuating circuits lead to voltages corresponding to positions outside the operator control region (e.g., in the region of the virtually extended touch screen area). In contrast, in an unextended circuit arrangement, an error in the actuating circuit would lead to voltages corresponding to positions at the edge of the touch screen.

In one embodiment, a circuit arrangement includes a resistive touch screen. The resistive touch screen includes a resistive first layer and a resistive second layer. The resistive first layer and the resistive second layer are arranged parallel above one another. The voltage dividers of the resistive first layer and the resistive second layer are formed by contact with the touch screen and are extended by electrical resistors arranged at the edges of the resistive first layer and the resistive second layer. The layers may be in rectangular form.

To date, the use of touch screens has been limited to non-safety-relevant applications, since the required safety integrity may not be achieved with standard commercial touch-sensitive screens. The addition of resistors allows error disclosure to be provided immediately for a substantial proportion of errors in an actuating circuit. Touch screens for safety-relevant applications allow the advantages of touch screens to be used even for applications that were not previously permitted due to safety concerns.

In one embodiment, the circuit arrangement includes an electrical first resistor having a first connection and a second connection. The first connection is electrically connected to a first edge of the first layer. The circuit arrangement also includes an electrical second resistor with a third connection and a fourth connection. The third connection is connected to a second edge of the first layer, with the second edge opposite the first edge. An electrical third resistor has a fifth connection and a sixth connection, with the fifth connection connected to a third edge of the second layer. The third edge is oriented at ninety degrees to the first edge. An electrical fourth resistor includes a seventh connection and an eighth connection, with the seventh connection connected to a fourth edge of the second layer. The fourth edge is opposite the third edge.

In another embodiment, the circuit arrangement includes a current source that is connected either between the second connection and the fourth connection or between the sixth connection and the eighth connection.

In one embodiment, the first layer may be in a form such that a first voltage drop having a uniform profile occurs between the first edge and the second edge when current flows.

The second layer may be in a form such that a second voltage drop having a uniform profile occurs between the third edge and the fourth edge when current flows.

In another embodiment, the circuit arrangement includes a high-impedance voltage measuring apparatus that is configured to ascertain a third voltage drop between a point of contact on the first layer and the second connection and a fourth voltage drop between the fourth connection and the point of contact. The point of contact is formed via local electrical shorting of the first layer to the second layer.

In addition, the voltage measuring apparatus may be configured to determine a fifth voltage drop between the point of contact and the sixth connection and a sixth voltage drop between the eighth connection and the point of contact.

In one embodiment, a control panel includes a touch screen according to one or more of the present embodiments.

In one embodiment, a medical imaging appliance includes a control panel according to one or more of the present embodiments. The control panel is configured and programmed for operator control of the medical imaging appliance.

In addition, a method for operating a resistive touch screen is provided. The coordinates (e.g., position) of a point of contact on the touch screen are ascertained using the circuit arrangement according to one or more of the present embodiments.

BRIEF DESCRIPTION OF THE DRAWINGS

Further special features and advantages will become evident from the explanations below relating to a plurality of exemplary embodiments with reference to schematic drawings.

DETAILED DESCRIPTION

Figure 1:
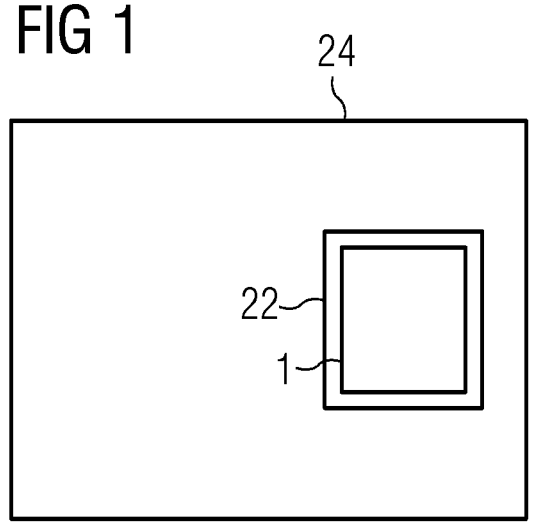
FIG. 1 illustrates a block diagram of one embodiment of a medical imaging appliance.

FIG. 1 illustrates a block diagram of a medical imaging appliance 24 (e.g., an x-ray angiography appliance or a computer tomograph) having a control panel 22. The control panel 22 includes a resistive touch screen 1 (e.g., a touch-sensitive screen) for inputting commands. Additional resistors connected to the edges of the layers of the touch screen 1 are used to virtually extend the touch-sensitive surface. Details in this regard are presented in FIG. 2 to FIG. 4 and described in more detail below.

Figure 2:
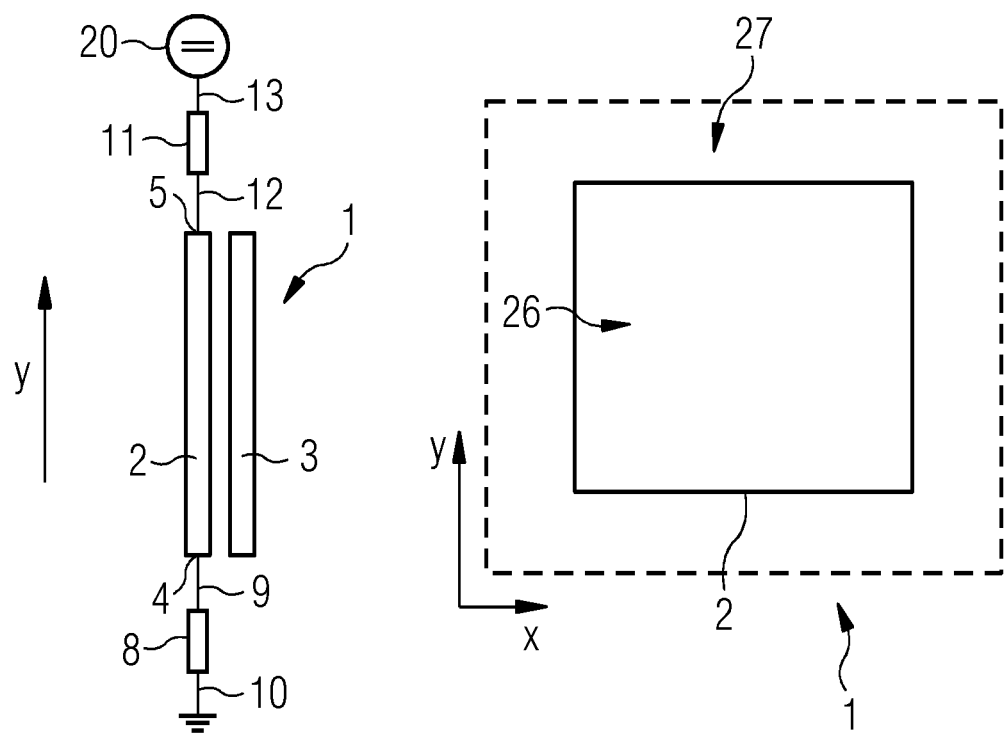
FIG. 2 illustrates a block diagram of one embodiment of a circuit arrangement with a touch screen.

The left-hand side of FIG. 2 illustrates a block diagram of one embodiment of a circuit arrangement including a rectangular, resistive touch screen 1. The right-hand side illustrates a plan view of the touch screen 1. In order to determine the position of a contact location (e.g., pressure point) on the screen, a current source 20 is used to send current through either the resistive first layer 2 or the resistive second layer 3 of the touch screen 1, causing a voltage drop in the resistive first layer 2 and the resistive second layer 3 that may be ascertained at the contacted location via a short to the second layer 3. FIG. 2 illustrates the y-direction for determining the y-axis position of the pressure location. For the purpose of determining the x-axis position (not shown), the current source 20 is connected to the second layer 3 crosswise (e.g., to the edges rotated through 90°).

In order to identify errors in the actuating electronics, resistors are connected to the first layer 2. The errors may simulate a voltage drop of maximum voltage, zero, close to maximum voltage, or close to zero, giving the appearance of contact at the edge of the touch screen 1. The first layer 2 has a first edge 4 in the y-direction and a second edge 5 opposite the first edge 4. An electrical first resistor 8 has a first electrical connection 9 and a second electrical connection 10. The first electrical connection 9 is conductively connected to the first edge 2. The second electrical connection 10 is connected to ground. An electrical second resistor 11 has a third electrical connection 12 and a fourth electrical connection 13. The third connection 12 is conductively connected to the second edge 5. The fourth connection 13 is conductively connected to the current source 20.

The additional connection of the first resistor 8 and second resistors 11 produces a virtually extended contact area 27 that is larger than the real contact area 26 that may be sensed haptically.

The first layer 2 and the second layer 3 may also be in round form, and the edges 4 to 7 may each be in semicircular form.

Figure 3:
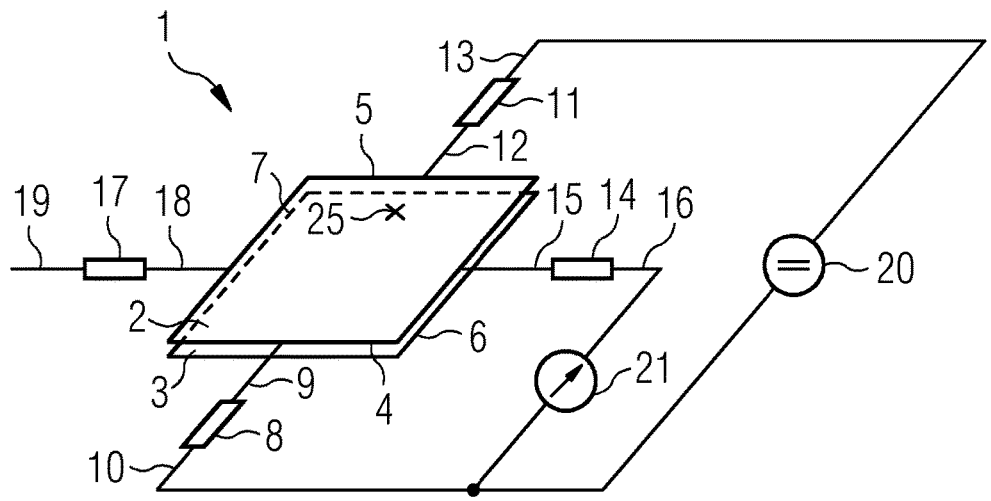
FIG. 3 illustrates a block diagram of a further embodiment of a circuit arrangement with a touch screen.

FIG. 3 uses a block diagram to show the measurement of the voltage drop when contact is made with the touch screen 1 in one dimension. At the point of contact 25, the first layer 2 of the touch screen 1 is shorted to the second layer 3 of the touch screen 1. The two layers 2 and 3 are arranged above one another congruently and separated by a distance. The edges 4 and 5 of the first layer 2 are connected to the two resistors 8 and 11 by connections 9 and 12. The two resistors 8 and 11 have connections 13 and 10 connected to the current source 20 or ground. The impression of a current into the resistive first layer 2 produces a voltage drop between the first edge 4 and the second edge 5. There is likewise a voltage drop across the first resistor 8 and the second resistor 11.

The resistive second layer 3 has the edges 6 and 7 that are rotated through 90° with respect to the edges 4 and 5. The third edge 6 is conductively connected to the third resistor 14 by a fifth connection 15. The fourth edge 7 is conductively connected to the fourth resistor 17 by a seventh connection 18. Between the sixth connection 16 (e.g., third resistor 14) and the second connection 10, the high-impedance voltage measuring apparatus 21 is used to measure the voltage drop between the point of contact 25 and the second connection 10. From knowledge of the length of the first layer 2 in the direction of current flow and the size of the resistors 8 and 11, and assuming a uniform voltage drop in the first layer 2, the position of the point of contact 25 may be determined in the direction of current flow. In the direction perpendicular thereto, the position of the point of contact 25 may be ascertained in similar fashion by connecting the current source 20 to the second layer 3 and by connecting the voltage measuring apparatus 21 to the first layer 2.

Figure 4:
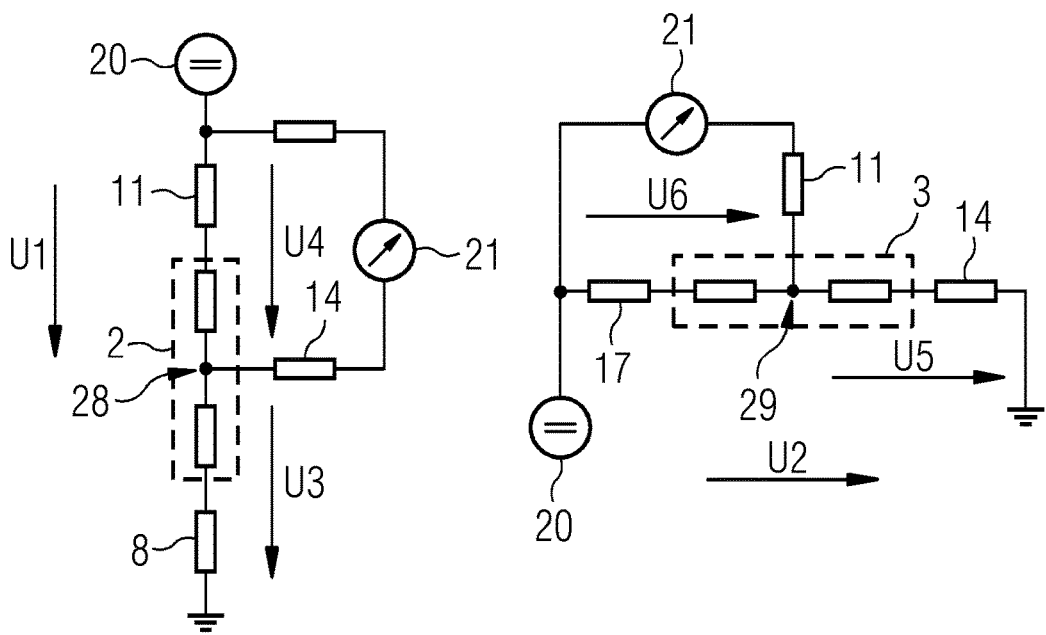
FIG. 4 illustrates a circuit diagram of one embodiment of a touch screen with the voltage profiles.

FIG. 4 illustrates the voltage dividers and voltage drops of the circuit arrangement shown in FIG. 3. The left-hand side of FIG. 4 illustrates the voltage divider 28 of the resistive first layer 2 that is formed by contact. The voltage divider 28 is connected to the first resistor 8 and the second resistor 11. The current source 20 delivers a current across the resistors 8 and 11 and the voltage divider 28. In the first layer 2, a first voltage drop U1 is produced. Between the first resistor 8 and the point of contact, the third voltage drop U3 is produced. Between the second resistor 11 and the point of contact, the fourth voltage drop U4 is produced. The voltage measuring apparatus 21 may be used to determine the voltage drops U3 and U4. FIG. 4 depicts the measurement of the fourth voltage drop U4.

The right-hand side of FIG. 4 illustrates the voltage divider 29 of the resistive second layer 3 that is formed by contact. The voltage divider 29 is connected to the third resistor 14 and the fourth resistor 17. The current source 20 delivers a current across the resistors 14 and 17 and the voltage divider 29. In the second layer 3, a second voltage drop U2 is produced. Between the third resistor 14 and the point of contact, the fifth voltage drop U5 is produced. Between the fourth resistor 17 and the point of contact, the sixth voltage drop U6 is produced. The voltage measuring apparatus 21 may be used to determine the voltage drops U5 and U6. The figure illustrates the measurement of the sixth voltage drop U6.

Although the invention has been illustrated and described in more detail by the exemplary embodiments, the invention is not restricted by the disclosed examples. Other variations may be derived therefrom by a person skilled in the art without departing from the scope of protection of the invention. For example, the invention may also be used for nonmedical applications.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

We claim:

1. A circuit comprising:
a resistive touch screen having a contact area, the resistive touch screen comprising a resistive first layer having a first perimeter and a resistive second layer having a second perimeter, wherein the first perimeter of the resistive first layer is arranged parallel to the second perimeter of the resistive second layer;
an electrical first resistor having a first connection and a second connection, wherein the first connection is at a first edge of the first perimeter of the resistive first layer; and
an electrical second resistor having a third connection and a fourth connection, wherein the third connection is at a second edge of the first perimeter of the resistive first layer, wherein the second edge is opposite the first edge,
wherein the electrical first resistor and the electrical second resistor are positioned outside of the first perimeter of the first layer and provide a virtually extended contact area that is larger than the contact area,
wherein voltage dividers of the resistive first layer and the resistive second layer formed by contact with the resistive touch screen are extended by the electrical first resistor and the electrical second resistor, and
wherein the circuit is configured to identify an error when the resistive touch screen is contacted by an operator at a point of contact within the contact area by depicting the point of contact as being within the virtually extended contact area that is outside of the contact area.

2. The circuit of claim 1, wherein the resistive first layer and the resistive second layer are in rectangular form.

3. The circuit of claim 2, further comprising:
an electrical third resistor having a fifth connection and a sixth connection, wherein the fifth connection is at a third edge of the second perimeter of the resistive second layer, wherein the third edge is oriented at ninety degrees to the first edge of the first perimeter of the resistive first layer; and
an electrical fourth resistor having a seventh connection and an eighth connection, wherein the seventh connection is at a fourth edge of the second perimeter of the resistive second layer, wherein the fourth edge is opposite the third edge,
wherein the electrical third resistor and the electrical fourth resistor are positioned outside of the second perimeter of the second layer.

4. The circuit of claim 1, further comprising:
an electrical third resistor having a fifth connection and a sixth connection, wherein the fifth connection is at a third edge of the second perimeter of the resistive second layer, wherein the third edge is oriented at ninety degrees to the first edge of the first perimeter of the resistive first layer; and
an electrical fourth resistor having a seventh connection and an eighth connection, wherein the seventh connection is at a fourth edge of the second perimeter of the resistive second layer, wherein the fourth edge is opposite the third edge,
wherein the electrical third resistor and the electrical fourth resistor are positioned outside of the second perimeter of the second layer.

5. The circuit of claim 4, further comprising:
a current source connected between the second connection and the fourth connection or between the sixth connection and the eighth connection.

6. The circuit of claim 5, wherein the resistive first layer is in a form such that a first voltage drop having a uniform profile is produced between the first edge and the second edge when a current flows.

7. The circuit of claim 5, wherein the resistive second layer is in a form such that a second voltage drop having a uniform profile is produced between the third edge and the fourth edge when a current flows.

8. The circuit of claim 5, further comprising:
a high-impedance voltage measuring apparatus configured to ascertain a third voltage drop between a point of contact on the resistive first layer and the second connection and a fourth voltage drop between the fourth connection and the point of contact, wherein the point of contact is formed via local electrical shorting of the resistive first layer to the resistive second layer.

9. The circuit of claim 4, further comprising:
a high-impedance voltage measuring apparatus configured to ascertain a third voltage drop between a point of contact on the resistive first layer and the second connection and a fourth voltage drop between the fourth connection and the point of contact, wherein the point of contact is formed via local electrical shorting of the resistive first layer to the resistive second layer.

10. The circuit of claim 9, wherein the high-impedance voltage measuring apparatus is configured to ascertain a fifth voltage drop between the point of contact and the sixth connection and a sixth voltage drop between the eighth connection and the point of contact.

11. The circuit of claim 1, wherein the resistive first layer is in a form such that a first voltage drop having a uniform profile is produced between the first edge and the second edge when a current flows.

12. The circuit of claim 11, wherein the resistive second layer is in a form such that a second voltage drop having a uniform profile is produced between the third edge and the fourth edge when a current flows.

13. The circuit of claim 11, further comprising:
a high-impedance voltage measuring apparatus configured to ascertain a third voltage drop between a point of contact on the resistive first layer and the second connection and a fourth voltage drop between the fourth connection and the point of contact, wherein the point of contact is formed via local electrical shorting of the resistive first layer to the resistive second layer.

14. The circuit of claim 1, wherein the resistive second layer is in a form such that a second voltage drop having a uniform profile is produced between the third edge and the fourth edge when a current flows.

15. The circuit of claim 14, further comprising:
a high-impedance voltage measuring apparatus configured to ascertain a third voltage drop between a point of contact on the resistive first layer and the second connection and a fourth voltage drop between the fourth connection and the point of contact, wherein the point of contact is formed via local electrical shorting of the resistive first layer to the resistive second layer.

16. A control panel comprising:
a resistive touch screen having a contact area, the resistive touch screen comprising a resistive first layer having a first perimeter and a resistive second layer having a second perimeter, wherein the first perimeter of the resistive first layer is arranged parallel to the second perimeter of the resistive second layer;
an electrical first resistor having a first connection and a second connection, wherein the first connection is at a first edge of the first perimeter of the resistive first layer; and
an electrical second resistor having a third connection and a fourth connection, wherein the third connection is at a second edge of the first perimeter of the resistive first layer, wherein the second edge is opposite the first edge,
wherein the electrical first resistor and the electrical second resistor are positioned outside of the first perimeter of the first layer and provide a virtually extended contact area that is larger than the contact area,
wherein the control panel is configured to identify an error when the resistive touch screen is contacted by an operator at a point of contact within the contact area by depicting the point of contact as being within the virtually extended contact area that is outside of the contact area.

17. A medical imaging appliance comprising:
a control panel comprising:
a resistive touch screen having a contact area, the resistive touch screen comprising a resistive first layer having a first perimeter and a resistive second layer having a second perimeter, wherein the first perimeter of the resistive first layer is arranged parallel to the second perimeter of the resistive second layer;
an electrical first resistor having a first connection and a second connection, wherein the first connection is at a first edge of the first perimeter of the resistive first layer; and
an electrical second resistor having a third connection and a fourth connection, wherein the third connection is at a second edge of the first perimeter of the resistive first layer, wherein the second edge is opposite the first edge,
wherein the electrical first resistor and the electrical second resistor are positioned outside of the first perimeter of the first layer and provide a vitually virtually extended contact area that is larger than the contact area,
wherein voltage dividers of the resistive first layer and the resistive second layer formed by contact with the resistive touch screen,
wherein the control panel is configured and programmed for operator control of the medical imaging appliance, and
wherein the control panel is configured to identify an error when the resistive touch screen is contacted by an operator at a point of contact within the contact area by depicting the point of contact as being within the virtually extended contact area that is outside of the contact area.

* * * * *

UNITED STATES PATENT AND TRADEMARK OFFICE
CERTIFICATE OF CORRECTION

PATENT NO. : 10,379,692 B2
APPLICATION NO. : 14/962117
DATED : August 13, 2019
INVENTOR(S) : Peter Greif et al.

Page 1 of 1

It is certified that error appears in the above-identified patent and that said Letters Patent is hereby corrected as shown below:

In the Claims

Column 8, Line 34-36:
"perimeter of the first layer and provide a vitually virtually extended contact area that is larger than the contact area"

Should be replaced with:
"perimeter of the first layer and provide a virtually extended contact area that is larger than the contact area"

Signed and Sealed this
Fifth Day of November, 2019

Andrei Iancu
*Director of the United States Patent and Trademark Office*